(12) United States Patent
Coykendall

(10) Patent No.: US 6,325,336 B1
(45) Date of Patent: Dec. 4, 2001

(54) HYDRAULIC TUBING CLAMP

(75) Inventor: William B. Coykendall, Lisbon, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/419,607

(22) Filed: Oct. 18, 1999

(51) Int. Cl.[7] ..................................................... F16L 3/23
(52) U.S. Cl. .......................................... 248/68.1; 248/74.2
(58) Field of Search .................................. 248/68.1, 74.1, 248/74.2, 74.3, 74.4, 74.5, 316.2, 316.6; 24/339, 545, 563

(56) References Cited

U.S. PATENT DOCUMENTS

| | | | | |
|---|---|---|---|---|
| 1,995,370 | * | 3/1935 | Walters | 248/68.1 |
| 2,061,463 | * | 11/1936 | Hall | 248/73 |
| 2,453,980 | * | 11/1948 | Hartman | 248/68.1 |
| 3,363,290 | * | 1/1968 | Camenisch | 248/68.1 |
| 3,982,304 | | 9/1976 | Menshen | 24/73 |
| 4,179,774 | * | 12/1979 | Bradbury | 248/68.1 |
| 4,304,077 | | 12/1981 | Muller | 52/115 |
| 4,358,080 | | 11/1982 | Wolker | 248/68 |
| 4,450,605 | | 5/1984 | Schaty | 24/457 |
| 4,550,891 | * | 11/1985 | Schaty | 248/68.1 |
| 4,865,279 | * | 9/1989 | Kosugi | 248/68.1 |
| 4,961,554 | * | 10/1990 | Smowton | 248/68.1 |
| 5,002,243 | | 3/1991 | Kraus et al. | 248/68.1 |
| 5,002,244 | | 3/1991 | Holbury et al. | 248/68.1 |
| 5,016,336 | * | 5/1991 | Barnett et al. | 248/74.2 |
| 5,263,671 | * | 11/1993 | Baum | 248/68.1 |
| 5,460,342 | * | 10/1995 | Dore et al. | 248/74.2 |
| 5,464,179 | * | 11/1995 | Ruckwardt | 248/68.1 |
| 5,542,339 | | 8/1996 | Kaczmarczyk et al. | 91/508 |
| 5,588,683 | | 12/1996 | Schliessner | 285/62 |
| 5,615,852 | | 4/1997 | Heldorn et al. | 248/74.5 |
| 6,073,891 | * | 6/2000 | Humber | 248/74.5 |

* cited by examiner

*Primary Examiner*—Anita King
*Assistant Examiner*—Jon A. Szumny
(74) *Attorney, Agent, or Firm*—Westman, Champlin & Kelly, P.A.

(57) ABSTRACT

A hydraulic tubing clamp is made of a resilient plastic or polyamide material with a mounting hole for accepting a fastener to attach the tubing clamp to a mounting surface of a product, such as a boom arm of a front end loader. Recessed grooves or tubing seats are formed with part cylindrical portions for accepting hydraulic tubes. The recessed grooves are accessible for snap fitting tubes into place through an opening that is more narrow than the widest parts of the recess. Once snap-fitted into place, the tubes are retained in the tubing clamp as a subassembly without the use of latches or other clamping devices. The preassembled bundle of tubes held by the clamp can be assembled on the loader or other product with greater ease and efficiency than trying to manually hold the tubes in place and then fasten or clamp the tubes to the product.

14 Claims, 4 Drawing Sheets

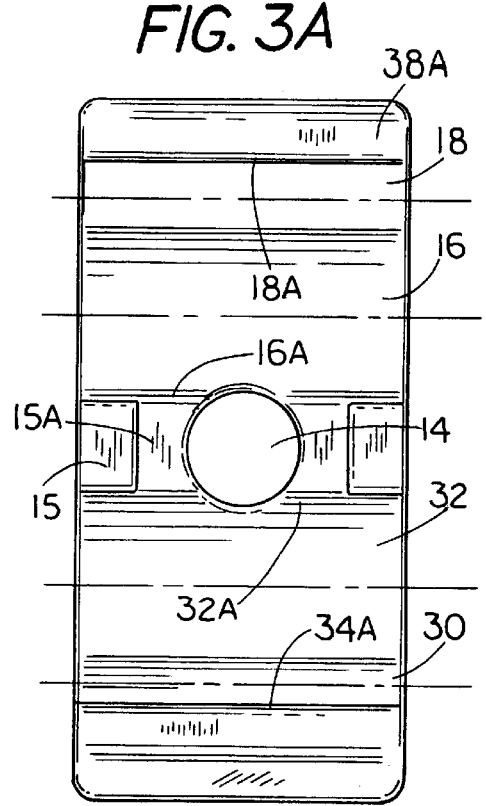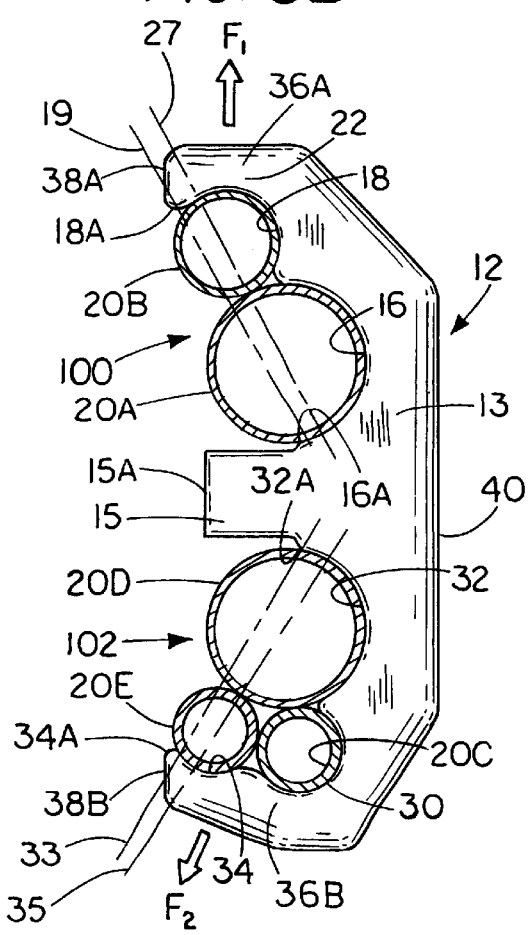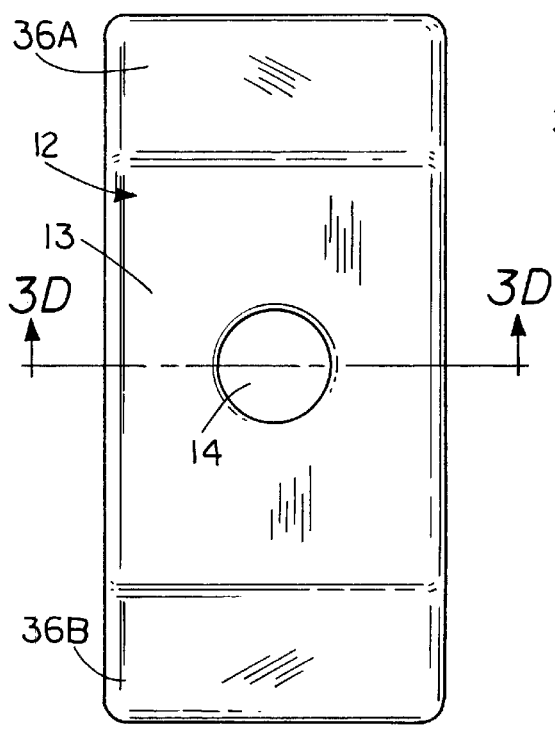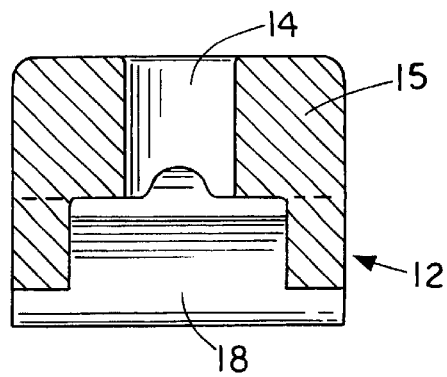

HYDRAULIC TUBING CLAMP

BACKGROUND OF THE INVENTION

The present invention relates to a clamp for assembly and mounting of a set of tubes used on equipment. More specifically, the invention relates to clamps used for bundling lengths of rigid hydraulic tubing before mounting to the equipment to hold the tubes together while they are clamped to a mounting surface, without having to individually hold the tubes while clamping.

Skid steer loaders use bundles of hydraulic tubing for routing fluid to and from hydraulic cylinders on the equipment. Combinations of two or three adjacent tubes are required to route the fluid from the hydraulic pump to cylinders on the outer ends of the boom. Mounting the tubes to the skid steer loader such that the preset bends and couplings are positioned correctly can be very cumbersome and difficult, especially with long lengths of tubing. Assembling the tubes together with a clamp prior to mounting allows the assembler to organize and pre-position the tubes relative to each other. Without preassembly of the tubes, the tubes must be mounted with individual clamps or a combination of clamping devices or fasteners necessary to hold the tubes together inside the tubing clamp. Space and cost restrictions often do not allow for individual tubing clamps. Additional fasteners and clamping devices further complicate and add cost to the tube mounting procedure. Thus, preassembly of the tubes using a single, snap-fitting clamp is advantageous for efficiency and manageability when mounting bundles of hydraulic tubing.

SUMMARY OF THE INVENTION

The present invention relates to a clamp for bundling a plurality of hydraulic tubes before mounting them on equipment. The bundled tubes are clamped to equipment that uses the tubes for routing pressurized fluid to and from hydraulic cylinders. Each clamp effects its tube holding function without the use of fasteners or other clamping devices.

A clamp of the present invention is made of flexible, resilient material, such as a plastic, preferably a polyamide, with part cylindrical recessed areas formed to support two or three cylindrically shaped tubes that extend along longitudinal axes of the recessed areas and snap-fit into place. The recessed areas are preferably symmetrically centered about a central axis in the clamp where a hole is cut to receive a fastener for attaching the tubing clamp to a mounting surface. The recessed areas are open to the exterior and the opening faces the mounting surface when the tubing and clamp are installed. The design of the recessed area creates a resilient arm portion that cooperates with a base and can be bent to enlarge the opening to permit inserting the tubes into the recessed area and then released to provide the necessary clamping forces to hold the tubes in the clamp body.

BRIEF DESCRIPTION OF THE DRAWINGS

FIG. 3A is a bottom plan view of the tubing clamp of FIG. 1;

FIG. 3B is an end elevational view of the tubing clamp of FIG. 1;

FIG. 3C is a top plan view of the clamp in FIG. 1;

FIG. 3D is a sectional view taken on Line 3D—3D in FIG. 3C.

DETAILED DESCRIPTION OF THE ILLUSTRATIVE EMBODIMENTS

Figure 1:
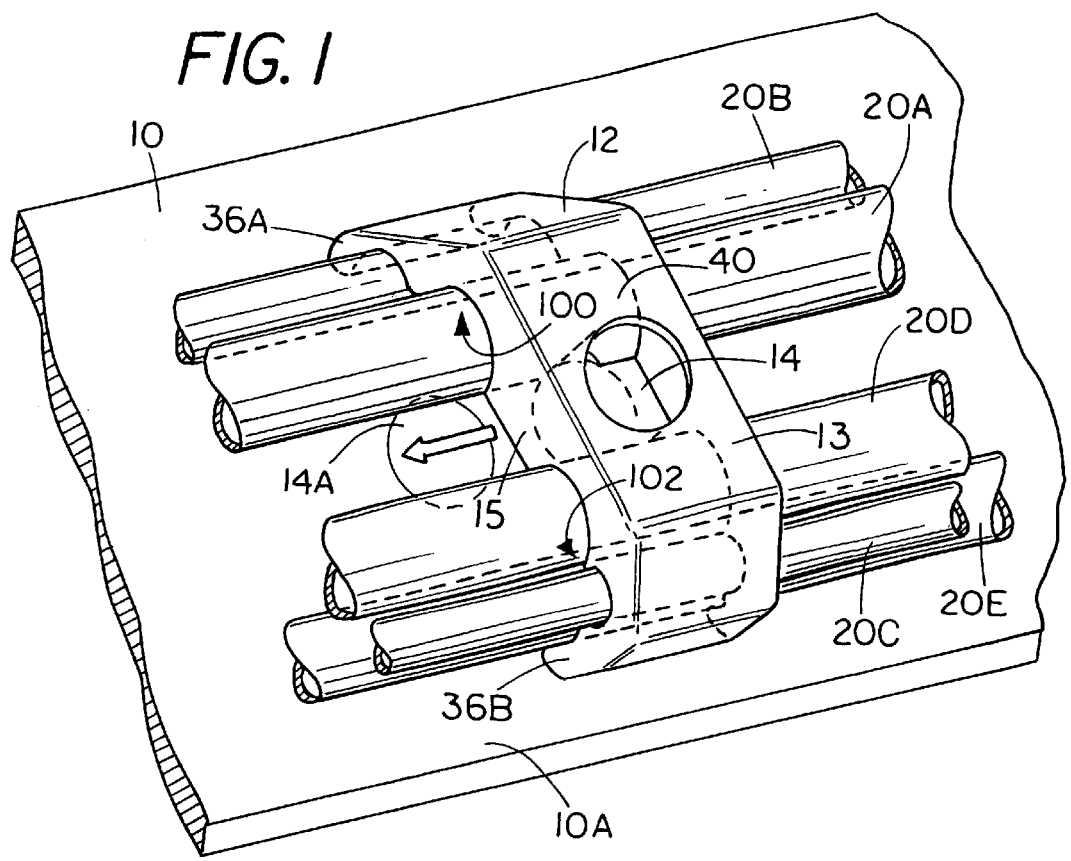
FIG. 1 is a perspective view of a hydraulic tubing clamp carrying two separate tube bundles positioned for mounting to a mounting surface.
Figure 2:
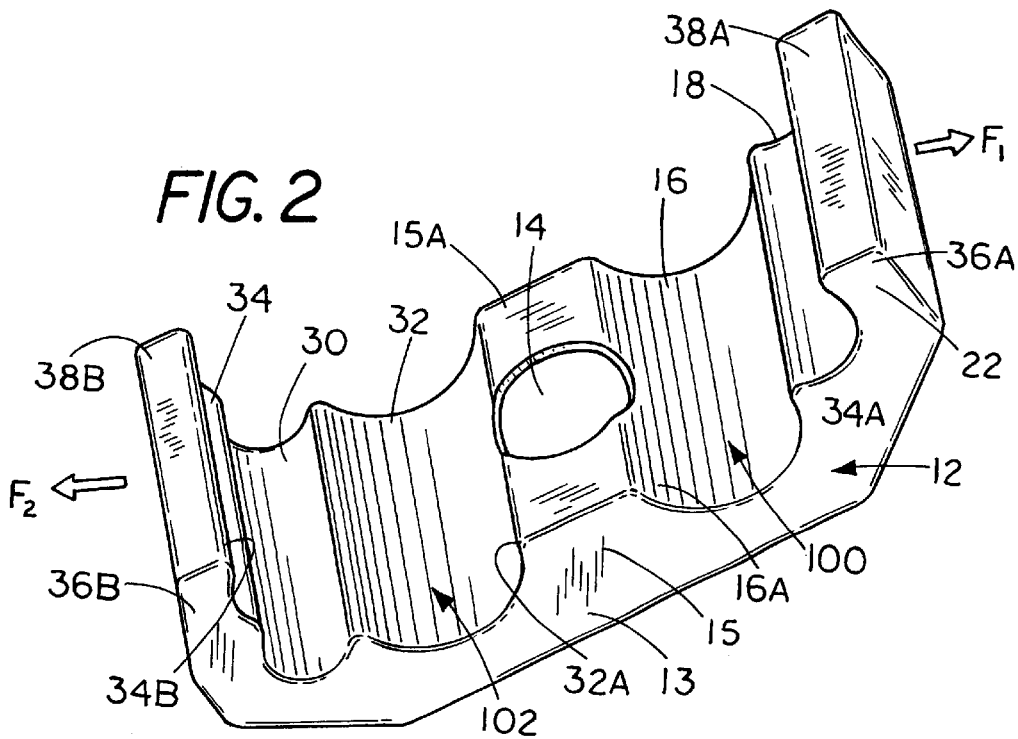
FIG. 2 is a bottom perspective view of the tubing clamp of FIG. 1 for clamping bundles of two and three tubes.
Figure 4:
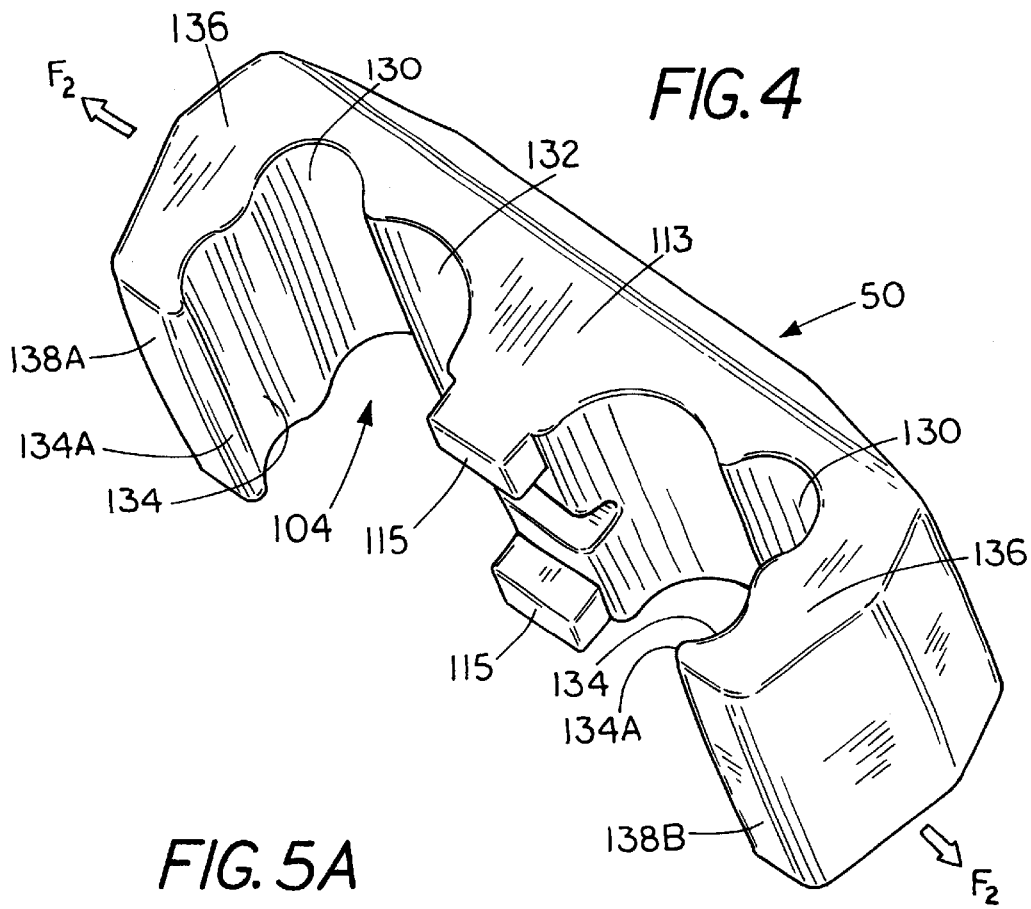
FIG. 4 is a perspective view of an alternative tubing clamp design for clamping two bundles of three tubes each.
Figure 5A:
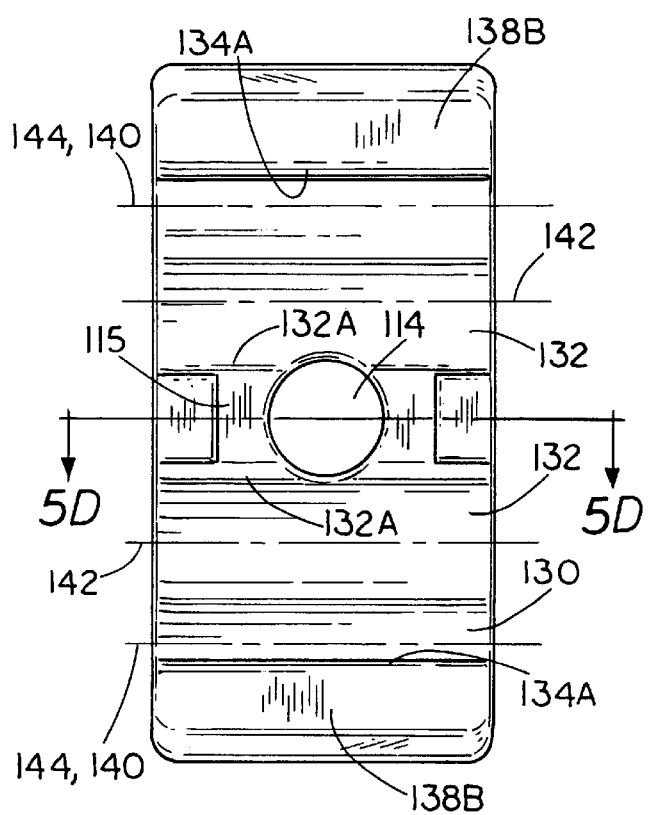
FIG. 5A is a bottom plan view of the tubing clamp in FIG. 4.
Figure 5B:
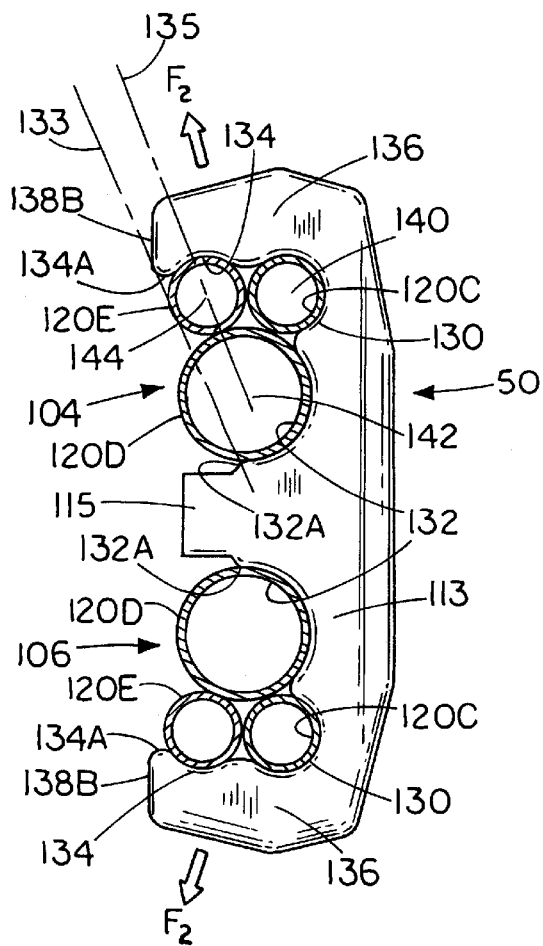
FIG. 5B is an end view of the tubing clamp of FIG. 4.
Figure 5C:
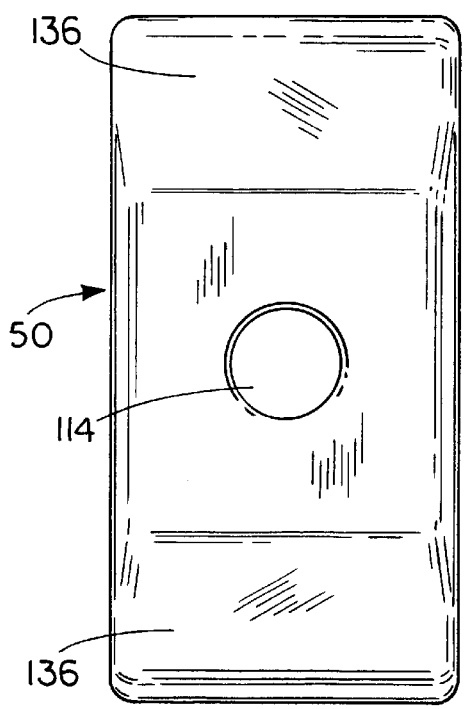
FIG. 5C is a top plan view of the tubing clamp design of FIG. 4.
Figure 5D:
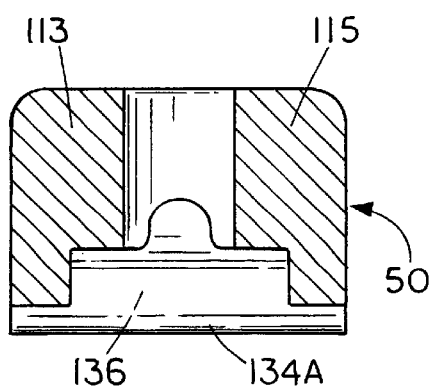
FIG. 5D is a sectional view taken on Line 8—8 in FIG. 5C.

Referring to FIG. 1, a portion of a loader boom 10 is shown schematically and exemplifies a mounting surface 10A to which hydraulic conduits or tubes 20A–20E are mounted. The tubes 20A–20E are used to route fluid under pressure to and from remote actuators, for example, tilt cylinders for a loader bucket or auxiliary equipment actuators supported on the equipment.

A tubing clamp 12 retains the tubes 20A–20E without additional latches before the tubing clamp is fastened to the mounting surface 10A. The tubing clamp 12 is preferably a somewhat resilient moldable material, such as a polyamide, and includes a base wall 13, and a center lug or arm, also called post, 15 integral with the base 13 and extending outwardly from the central part of the base 13. The arm or post 15 is part of the base. The base 13 also supports first and second resilient arms 36A and 36B which are spaced from opposite sides of the arm or post 15 to define recesses or recessed regions 100 and 102 between the center arm or post 15 and the respective resilient arm 36A and 36B. Hole 14 in the clamp and hole 14A in the boom 10 receive a bolt or fastener for mounting the tubing clamp 10 in position. The tubes 20A–20E will remain held in the clamp for one-handed holding of all five tubes as they are mounted on the boom.

FIGS. 2 and 3A–3D illustrate the details of construction of one form of tubing clamp 12. Tubing clamp 12 is designed to hold two parallel tubes in a first recessed area 100 on one side of arm or post 15 and three parallel tubes in a second recessed area 102 on the opposite side of arm or post 15. The arm or post 15 is essentially part of the base 13. First recess or recessed region 100 has a first part cylindrical groove or tube seat 16 closest to arm or post 15 for placement of a first tube 20A. The part cylindrical groove or tube seat 16 has a longitudinal axis along which the supported tube length 20A is oriented. Once the tube length 20A is in place, a second tube length 20B is forced into a second part cylindrical groove or tube seat 18 in the first recessed area 100. Part cylindrical groove or tube seat 18 is positioned parallel to and adjacent to the part cylindrical groove or tube seat 16. The two grooves or tube seats 16 and 18 are formed so a plane 19 defined by a line along an edge 16A on the inner side of part cylindrical groove or tube seat 16A and a line along an outer edge 18A or groove or tube seat 18 is to the outside of a diametrical plane 27 defined by the axes of tubes 20A and 20B. For tube 20B to fit into place, tubing clamp arm 22 must move in the direction of the arrow $F_1$. Arm 22 flexibly and resiliently can be moved in the direction $F_1$ outwardly, away from the portion of base 13 forming line 16A to allow tube 20B to enter part cylindrical surface or tube seat 18, then the arm 22 moves or springs back into its original position, thereby establishing a clamping force on tube 20B. The clamping force urges the tubes 20A and 20B to seat in the grooves or tube seats 16 and 18.

A snap-fit is established between tube 20A and part cylindrical groove or tube seat 18. Once tube 20A has snapped into place, both tube 20A and 20B are firmly held in place in the tubing clamp 12 without the use of additional fasteners or clamping devices.

The grooves or tube seats are described as part cylindrical, but can be grooves that are ribbed, or different shape, but the edges 16A and 18A are to be spaced apart less than the maximum width of the recessed surfaces, which permits a transverse clamping force with a vector toward the interior surface of the tube recesses.

Recessed region 102 of tubing clamp 12 is designed similarly to recess or recessed region 100, but with part cylindrical grooves or tube seats for three tubes rather than two tubes. The grooves or tube seats 30, 32 and 34 form recesses that have longitudinal axes parallel to the axes of grooves or tube seat 16 and 18. Part cylindrical groove or tube seat 30 has a cross section that extends greater than 180° such that tube 20C is individually held in place by the clamping force of arm 36 once the tube 20C has been forced into part cylindrical portion 30 tube 20C snaps in place.

Part cylindrical groove or tube seat 32 in recess or recessed region 102 is positioned with its axis parallel to the axis, and adjacent to, groove or tube seat 30 for positioning of tube 20D. Groove or tube seat 32 extends for less than 180° as shown. Tube 20D is not clamped into place until a third tube 20E is forcibly snapped into groove or tube seat 34 and against the tubes 20C and 20D. Part cylindrical groove or tube seat 34 is also positioned with its axis parallel to the axis of and adjacent to groove or tube seat 30 and extends outwardly, and inclined slightly toward the center of the clamp from groove or tube seat 30. The groove or tube seat 32 is shallow and extends only partially around the tube 20D that seats on it.

The line defined by edge 34A and the line defined by edge 32A on each side of the post 15 define a plane 33 that is to the outside of the diametrical plane 35 defined by the axes of tubes 20D and 20E. Tube 20E is snapped into place as arm 36B is forced in a direction indicated by arrow $F_2$. Once tube 20E is fitted into place against groove or tube seat 32 and tube 20D, arm 36 returns to its unflexed position establishing a clamping force on tube 20E. All three tubes 20C, 20D and 20E are then urged toward the tube seats and are held in the tubing clamp 12 without latches or other clamping devices.

With the three tubes clamped into recess or recessed region 102, and two tubes clamped in recess or recessed region 100 or all five tubes clamped in place, tubing clamp 12 is prepared for one handed mounting to the mounting surface shown in FIG. 1. The outer ends of arms 36A and 36B have surfaces 38A and 38B that form a plane with an end surface 15A of post 15 and these surfaces seat against mounting surface 10. A fastener is inserted through holes 14 and 14A, holding the tubing clamp and, capturing the tubes held against the mounting surface 10.

Although grooves or seats 16, 18 and 30, 32 and 34, are shown as part circular in cross section, the cross sectional shape can vary if the tubes are engaged at locations so they are positively seated.

The width of the tube insertion opening between the edges 16A and 18A and 32A and 34A, respectively, is smaller or narrower than the two diameters of the outer tubes held in the recess or recessed region so a force urging the tubes toward their seats is provided.

FIGS. 4 and 5A–5D illustrate an alternative tubing clamp design 50 with recesses or recessed regions 104 and 106, each clamping three tubes. Positioning and design of recess or recessed region is identical to recess or recessed region 102 in that three tubes are held and recessed region 104 is a mirror image of recessed region 106. The clamp 50 is symmetrical about its center plane, which is centered on a post 115. Thus, clamping the three tubes in each recess or recessed region of clamp 50 is as explained for recess or recessed region 102.

FIGS. 5A–5D illustrate placement of the tubes in the tubing clamp 50 with the tubes represented at 120C, 120D and 120E.

Recessed area or regions 104 and 106 of tubing clamp 50 are mirror images and will be numbered identically. Each recessed region has part cylindrical grooves or tube seats for three tubes 120C, 120D and 120E. The grooves or tube seats 130, 132 and 134 form recesses that have parallel longitudinal axes 140, 142 and 144. Part cylindrical groove or tube seat 130 has a cross section that extends greater than 180° such that tube 120C is individually held in place by the clamping force of arm 136 once the tube 120C has been forced into part cylindrical portion 130 tube 120C snaps in place.

Part cylindrical grooves or tube seats 132 in each recess or recessed region 104 and 106 is positioned with its axis 142 parallel to the respective axis 140, and adjacent to groove or tube seat 130 for positioning of tube 120D. Groove or tube seat 132 extends for less than 180° around its axis as shown. Tube 120D is not clamped into place until a third tube 120E is forcibly snapped into groove or tube seat 134 and against the tubes 120C and 120D. Each part cylindrical groove or tube seat 134 is also positioned with its axis 144 parallel to the axis 140 and adjacent to groove or tube seat 130. The seat extends outwardly from the base and curves to be inclined slightly toward the center post 115 of the clamp 50 from groove or tube seat 130. The groove or tube seat 132 is shallow and extends only partially around the tube 120D that seats on it.

The lines on each of the recesses 104 and 106 defined by edge 134A and the lines defined by edge 132A on each side of the post 115, define a plane 133 that is to the outside of the diametrical plane 135 defined by the respective axes of tubes 120D and 120E. Tube 120E is snapped into place as the respective arm 136 is forced in a direction indicated by the respective arrow $F_2$. Once tube 120E is fitted into place against groove or tube seat 132 and the surfaces of tube 120D, the arm 136 that was forced outwardly returns to its unflexed or normal position establishing a clamping force on tube 120E. All three tubes 120C, 120D and 120E are then urged toward the respective tube seats and are held in the tubing clamp 50 without latches or other clamping devices.

With the three tubes clamped into each recess or recessed region 104 and 106 are all six tubes clamped in place, tubing clamp 50 is prepared for one handed mounting to the mounting surface shown in FIG. 1. The outer ends 136A of arms 136 on each side have surfaces 138A and 138B that form a plane with an end surface 115A of post 115 and these surfaces seat against mounting surface 10. A fastener is inserted through hole 114, holding the tubing clamp 50 and capturing the tubes held against the mounting surface 10 as in the first form of the invention. Here, too, the width of the tube opening on each side of post 115 is less than the diameters of the tubes 120D and 120E, so a force is generated to urge the tubes toward their seats.

The assembly of the plurality of tubes onto a loader boom arm or other product is simplified, since by grasping and moving the clamp all of the tubes will be lifted. The tubes will be oriented parallel and properly spaced, and one hand can hold all tubes at once. The other hand then is free to insert the receiving fastener.

It should be noted that the form of clamp holding three tubes also will work to hold the two outer tubes. The tube 20C or 120C can be left out and the clamp will work for the outer two tubes.

Although the present invention has been described with reference to preferred embodiments, workers skilled in the art will recognize that changes may be made in form and detail without departing from the spirit and scope of the invention.

What is claimed is:

1. A tubing clamp for holding at least two rigid tubes relative to one another comprising:

a clamp body;

a recessed region having at least first and second spaced apart tubing seat surfaces bounded by spaced clamp arms that extend outwardly from the tubing seat surfaces and have a length along a longitudinal plane, at least one of the clamp arms being resiliently movable in a direction perpendicular to the longitudinal plane, the clamp arms forming an opening to the recessed region between the arms defined by spaced, longitudinally extending edges on the clamp arms, the edges defining a plane that is adapted to be to the outside of a reference plane defined by the central axes of two outermost tubes when positioned on the tubing seat surfaces in the recessed area;

the tubing seat surfaces having longitudinal seat axes that are substantially parallel and parallel to the longitudinal plane, each tubing seat surface being sized and shaped for receiving and seating a tube, whereby the tubing seat surfaces are positioned adjacent to each other such that tubes seated thereon and defining the reference plane are within the opening and the diameters of the tubes being greater than the distance between the edges of the openings for interference fitting of the tubes within the recessed region.

2. The tubing clamp of claim 1, wherein the clamp body has seating surfaces on opposite sides of the recessed region that are coplanar and positioned to the outer side of the longitudinally extending edges.

3. The tubing clamp of claim 2, wherein the body has an aperture extending therethrough substantially perpendicular to the seating surfaces for receiving a fastener to clamp the seating surfaces onto a structure.

4. The tubing clamp of claim 2, wherein the clamp body seating surfaces are adapted to be on a plane outwardly from surfaces of tubes held in the tubing clamp.

5. The tubing clamp of claim 1 wherein the tubing seat surfaces are part cylindrical.

6. A tubing clamp for holding at least two rigid tubes in spaced relationship relative to one another comprising:

a clamp body having a base and a first tubing clamp arm that extends from the base to define a recessed region, the first arm being resiliently movable in a direction to expand an opening to the recessed region;

the body and first arm having a plurality of tube seat surfaces adapted to receive and engage tubes in the recessed area, the laterally outer most portions of an outermost pair of tube seat surfaces relative to the base defining a pair of spaced parallel edges, one of which edges is on the first arm, and the edges defining a plane that is on an outer side of a tube seat plane defined by lines that are at a maximum width of the outer most pair of tube seat surfaces having the edges, whereby the first arm must move an edge thereon away from the other edge when two tubes are to be seated on the outermost pair of tube seat surfaces, and the arm providing a force on tubes in the recessed region toward the tube seat surfaces in the recesses.

7. The tubing clamp of claim 6, wherein the tube seat surfaces have portions that are part cylindrical and adapted to be substantially the same diameter as tubes held in the tubing clamp.

8. The tubing clamp of claim 7, wherein the tubing clamp has support surfaces spaced outwardly from the base and on a plane that is adapted to lie to the outside of tubes held in the clamp.

9. The tubing clamp of claim 6, wherein the clamp body has a central post and two tubing clamp arms to define two recessed regions, each arm being spaced from opposite sides of the central post, there being a plurality of tube seat surfaces on each side of the central post, with each arm adapted to be resiliently movable to clamp a plurality of tubes in place in each recessed region.

10. The clamp of claim 9, wherein said base portion has a central post member, and the clamp has a pair of arms on the opposite sides of an spaced from the central post member, there being at least a separate pair of recessed surface portions between the central post member and each of the resilient arms adapted to be formed to urge tubes on opposite sides of the central member into the respective recessed surface portions.

11. The clamp of claim 10, wherein said central post member has an aperture therethrough for receiving a fastener adapted to secure the clamp body and tubes held thereby onto a support surface.

12. The clamp of claim 11, wherein said clamp is adapted to be of size so that it can be gripped in a hand while the tubes are in place in the clamp body.

13. The clamp of claim 10, wherein the arm and central post member have outer end support surfaces lying on a common plane which is spaced outwardly from the recessed surface portions adapted to overlie tubes held in the clamp body.

14. A clamp having a clamp body for holding at least three rigid tubes having parallel axes whereby the tubes are in contact with each other when installed in the clamp, said clamp body including a base portion, said base portion forming a reaction member, a resilient arm along a lateral side of said base portion and extending outwardly from said base portion, said arm adapted to combine with said base portion to define at least three recessed surface portions against which tubes will seat, including side recessed surface portions and a center recessed surface portion being recessed more than the side recessed surface portions, said surface portions adapted to terminate at lateral sides of said clamp body along longitudinally extending edges on the arm that define a plane on an outward side of a plane defined by central axes of tubes supported in the side recessed surface portions, whereby the resilient arm can be laterally separated from other portions of the clamp body to seat tubes in the recessed surface portions, and the arm resiliently moving to engage an adjacent tube in the recessed surface portions and cause tubes in the recessed surface portions to be urged into the recessed surface portions.

* * * * *